Jan. 25, 1949.   R. F. JACKSON   2,459,942
RECIPROCATING TOOL
Filed April 1, 1948   2 Sheets-Sheet 1
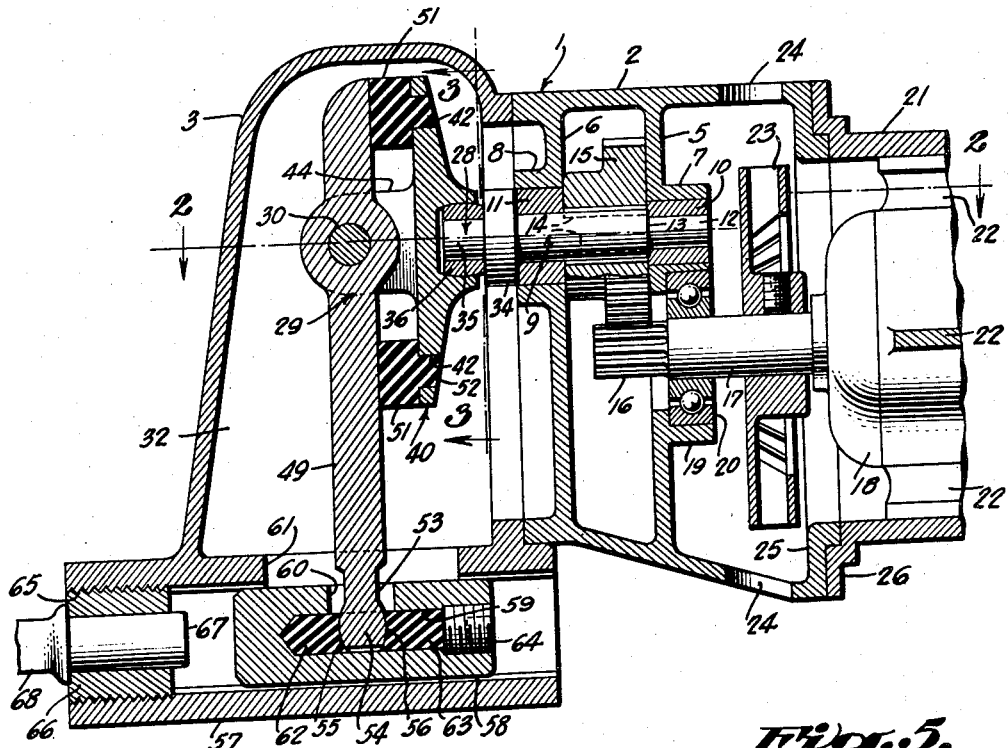
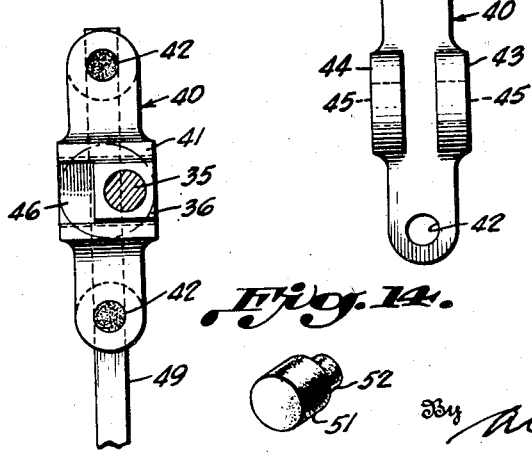
Inventor
RUPERT F. JACKSON
By Almon S. Nelson
ATTORNEY Jan. 25, 1949.  R. F. JACKSON  2,459,942
RECIPROCATING TOOL
Filed April 1, 1948  2 Sheets-Sheet 2
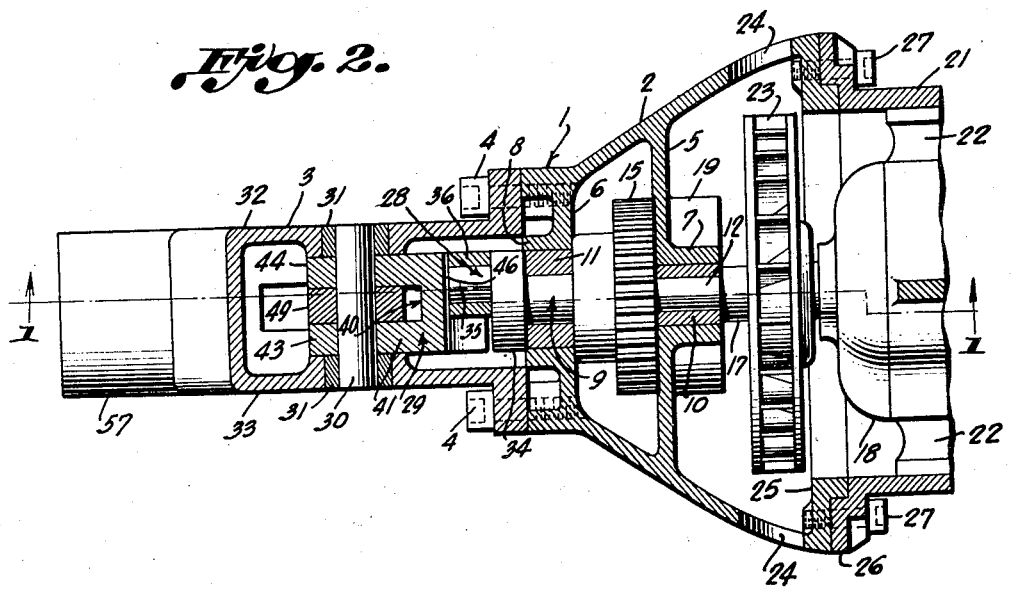
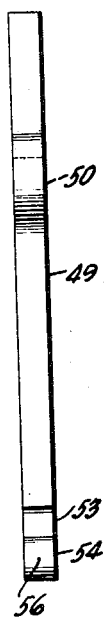
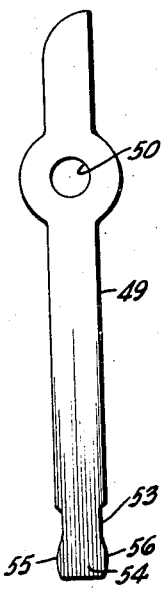
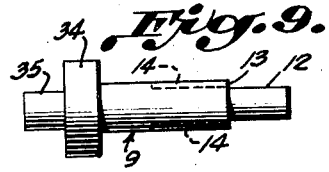
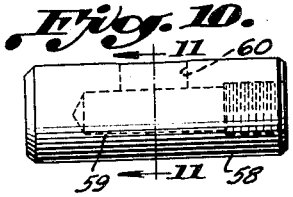
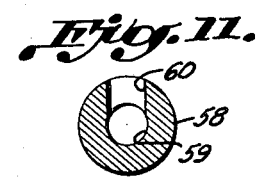
Inventor
RUPERT F. JACKSON
By Almon S. Nelson
ATTORNEY Patented Jan. 25, 1949

2,459,942

UNITED STATES PATENT OFFICE 2,459,942

RECIPROCATING TOOL

Rupert F. Jackson, Cleveland, Ohio, assignor of one-half to Alfred Knudsen, Mentor, Ohio Application April 1, 1948, Serial No. 18,432

13 Claims. (Cl. 74—45)

This invention relates to an improvement in reciprocating tools, such, for example, as an electrically driven hammer, chisel, or drill, and machines of kindred type which can be handled and controlled by a single operator.

More particularly, the invention relates to, and the primary object of the invention is to provide, a novel means for converting rotary motion to reciprocating motion.

Another of the objects of the invention is to provide a reciprocating tool which is light in weight, simple in construction, and of compact and balanced design.

A further object of the invention is to provide a reciprocating tool which has fewer friction points, thereby requiring a minimum in lubrication of parts, and providing for highly efficient operation.

Another object of the invention is to provide means for converting rotary motion to reciprocating motion, along an axis substantially parallel to the axis of the rotary shaft, in which no pitman is required.

An additional object of the invention is to provide means for converting rotary motion to reciprocating motion including resilient bumper elements between certain members of the means, whereby the speed of the reciprocating element or piston is increased at or near the ends of its stroke due to the compression and subsequent expansion of the resilient bumper elements, the length of stroke of the reciprocating element is increased, more hitting power is developed at or near the end of the stroke, and vibration is reduced to a minimum.

Other and further objects of the invention will become apparent as the description proceeds, reference being made to the accompanying drawings forming a part of the present disclosure, wherein:

Fig. 1 is a fragmentary sectional view showing the construction of my improved device, taken along the line 1—1 of Fig. 2, looking in the direction of the arrows;

Fig. 2 is a sectional view taken along the line 2—2 of Fig. 1, looking in the direction of the arrows;

Fig. 3 is a fragmentary sectional view taken along the line 3—3 of Fig. 1, looking in the direction of the arrows;

Figs. 4 and 5 are front and side elevational views, respectively, of the rocker arm;

Figs. 6 and 7 are rear and side elevational views, respectively, of the beam;

Figs. 8 and 9 are front and side elevational views, respectively, of the eccentric or crank shaft, the rotary motion of which shaft is converted to reciprocating motion;

Fig. 10 is a side elevational view of the piston;

Fig. 11 is a sectional view taken along the line 11—11 of Fig. 10, looking in the direction of the arrows;

Figs. 12 and 13 are end and side views, respectively, of the slide shoe; and

Fig. 14 is a perspective view of one of the resilient bumper elements connecting the rocker arm to the beam for oscillation therewith.

Referring in detail to the drawings, wherein for purposes of illustration the preferred embodiment of my invention is shown, the housing 1 which encloses the operating parts of the reciprocating tool (exclusive of the motor drive means) is preferably made in two sections 2 and 3 secured together by bolts 4 or other suitable means.

The housing member 2 is provided with spaced transverse partitions 5 and 6 having axially aligned, flanged openings 7 and 8, respectively, in which a crank or eccentric shaft 9 is rotatably mounted in bearings 10 and 11. In the embodiment illustrated, the end 12 of the shaft received in the bearing 10 is of reduced diameter thereby providing a shoulder 13 limiting the rearward movement of the shaft.

The preferred means for rotating the shaft 9 insofar as the entire tool is concerned will now be described, however, it is to be understood that insofar as the broader aspects of my invention are concerned, i. e., the means for converting rotary motion to reciprocating motion, it is immaterial how the shaft 9 is rotated.

The portion of the shaft 9 extending between the partitions 5 and 6 is provided with one or more keyways 14 and a reduction gear 15 is keyed thereto. The gear 15 is driven by a pinion 16 on the end of an extended shaft 17 of an electric motor 18. The forward end of the shaft 17 extends through a flanged opening 19 in the partition 5 and is journaled therein by means of an anti-friction bearing 20.

The motor 18 is supported within an open-end cylindrical housing 21 by means of a plurality of spaced web members 22, and a centrifugal-type fan 23 is mounted on the motor shaft 17. The fan 23 draws air into the rearward end of the housing 21, through and around the motor 18 between the webs 22, and discharges the same through openings 24 provided in the rearward end portion of the housing member 2.

The housing 2 is provided at its rearward end with an annular, inwardly and thence rearwardly directed flange 25 abutting a complementary shaped annular flange 26 on the forward end of the housing 21, and the housings 2 and 21 are secured together by means of bolts 27 extending through the flanges 25 and 26.

The means for converting the rotary motion of the shaft 9 to reciprocating motion comprises an eccentric or crank mechanism 28 secured to and driven by the shaft 9, and a rocker arm assembly 29 actuated by the crank mechanism 28 and mounted for oscillation on a shaft or pin 30, the axis of which extends in a direction substantially at right angles to the axis of the shaft 9. The pin 30 is mounted in suitable bearings 31 in the sidewalls 32 and 33 of the housing 3, and, as illustrated in Fig. 1, the axes of the shafts 9 and 30 lie in a common (horizontal) plane. The latter arrangement is preferred but is not necessary, however, since the axis of the shaft or pin 30 may, if desired, be positioned above or below the axis of the shaft 9 with the tool positioned as illustrated in Fig. 1. It is only necessary that the shafts 9 and 30 extend generally in mutually perpendicular directions.

The eccentric or crank mechanism 28 preferably comprises a circular web or crank arm 34 secured to or formed integral with the shaft 9, and a crank pin 35 secured to the arm 34. A sliding block 36 provided with an opening 37 is rotatably, and if desired or necessary, also slidably mounted on the crank pin 35, and two opposite sides 38 and 39 of the said block have convex surfaces of revoltion extending transversely thereof for a reason to be presently described. It will be obvious, of course, that instead of the crank arm 34 and crank pin 35, an eccentric circular cam disc of well known construction may be substituted, and in fact, an eccentric circular cam disc having a peripheral transversely extending convex surface of revolution may be substituted for the arm 34, pin 35 and block 36. The latter construction is not preferred, however, since it provides line contact rather than surface contact between the cam and its follower.

The rocker arm assembly 29 preferably comprises an elongate rocker arm 40 having a rearwardly extending thickened central portion 41, and an opening 42 extending therethrough adjacent each end thereof. A pair of spaced pivot arms 43 and 44 extend forwardly from the central portion of the rocker arm 40. The arms 43 and 44 are provided with axially aligned openings 45 through which the pin 30 extends to pivotally mount the rocker arm 40. The thickened portion 41 of the arm 40 is provided with a transverse slot 46, preferably extending entirely therethrough, and the sides 47 and 48 of the said slot have concave surfaces of revolution complementary to the convex surfaces of revolution of the sliding block 36 which is received in the said slot. It will be obvious from the foregoing that when the crank pin 35 is rotated by the motor 18, the block 36 will slide back and forth in the slot 46, thereby causing oscillation of the rocker arm 40, and the depth of the slot 46 is critical to the extent that sufficient space must be provided between the end of the pin 35 and/or the forward side of the block 36 to permit the oscillatory movement of the rocker arm without binding. Thus the depth of the slot 46 must be slightly greater than the depth to which the eccentric or crank mechanism extends thereinto.

An elongate beam 49, somewhat longer than the rocker arm 40, is pivotally mounted on the pin 30 between the arms 43 and 44 of the rocker arm by means of an opening 50 extending therethrough and positioned between its longitudinal center and one of its ends. The beam 49 is connected to the rocker arm 40 on each side of its pivoted axis or the opening 50 by resilient means such as the rubber buttons or bumpers 51. The rubber bumpers 51 are provided with reduced end portions 52 received in the openings 42 adjacent the ends of the rocker arm 40 to secure the same in place.

Insofar as the broader aspects of my invention are concerned, the beam 49 may be integrally connected to the rocker arm 40, however, in impact tools of the type disclosed specifically herein, it is preferred to provide resilient means connecting the beam and rocker arm to give a "whipping action" to the reciprocating element or piston and to reduce vibration as will be more fully described presently.

The free end 53 of the beam 49, i. e., the end extending beyond the rocker arm, is reduced somewhat and provided with a knob 54 comprising forward and rearward arcuate surfaces 55 and 56.

A barrel or cylinder 57 is suitably connected to the housing 3, or formed integral therewith, and the axis of the said cylinder is substantially parallel to the axis of the shaft 9.

A piston 58 is provided in the cylinder 57 for linear reciprocation therein, and the said piston is provided with an axial bore 59 extending inwardly from one end thereof to a point adjacent the other end thereof. Centrally of the piston 58, an elongate axially extending opening 60 opens into the bore 59, and the free end 53 of the beam 49 extends through an elongate axially extending opening 61 in the cylinder 57 and the opening 60 whereby the knob 54 is received in the bore 59 of the piston 58.

The oscillating beam 49 is pivotally connected to and imparts linear reciprocating motion to the piston 58 by means of resilient elements such as the rubber cylindrical elements 62 and 63 positioned in the bore 59 of the piston, one on each side of and in engagement with the knob 54 of the beam. The open end of the bore 59 is threaded to receive a set screw 64 whereby the knob end 54 of the beam may be tightened securely in place within the piston.

The forward end of the barrel or cylinder 57 is internally threaded as indicated at 65 to receive a bushing 66. The bushing 66 receives the tool shank 67 of the usual reciprocating tool 68, which may be a hammer, chisel, drill or the like, and it will be obvious that different bushings may be used to accommodate different diameter tool shanks.

In operation, the motion set up by the beam 49 in conjunction with the resilient elements 51 between the rocker arm 40 and the beam 59, and the resilient elements 62 and 63 between the reciprocating element or piston 58 and the free end of the bam 49 develops a "whipping action" in the resilient elements 51, 62 and 63, which "whipping action" is developed and imparted to the piston 58 at or near the ends of its stroke.

Referring to Fig. 1, it will be obvious that when the piston 58 is actuated to the left, the rocker arm 40 and beam 49 will be moving in a clockwise direction, and the lower resilient element 51 and the resilient element 62 will be compressed. At or near the end of stroke of the piston, the direction of movement of the rocker arm 40 changes to counter-clockwise, however, the speed of the beam 49 is increased and its movement continues momentarily in a clockwise direction due to expansion of the lower resilient element 51. This motion is imparted to the piston 58 and in addition, when the direction of movement of the beam 49 changes to counter-clockwise, the speed of the piston is again increased in its movement toward the left (Fig. 1) due to the expansion of the resilient element 62. This action may properly be called a "whipping action" and it will be obvious that the upper resilient element 51 and the resilient element 63 will be slightly compressed before the piston 58 actually starts its return movement. Similar action obviously also takes place at or near the other end of the stroke of the piston 58.

This "whipping action" results in an increase in the length of stroke of the piston over what it would be if rigid instead of resilient connecting elements were used, and also results in an increase in the hitting power developed by the piston at or near the ends of its stroke. Stated in other words, the expansion of the compressed resilient elements 51, 62 and 63 at or near the ends of the stroke of the piston 58 acts like the cracking of a whip thereby increasing the speed and hitting power of the reciprocating element or piston.

The reciprocating piston also gives the desired impact to the tool shank 67 with a minimum of vibration due to the resilient elements 51 between the rocker arm 49 and the beam 59, and the resilient elements 62 and 63 between the piston 58 and the free end 53 of the beam 49. Kick on the back stroke in the cylinder is substantially entirely eliminated by this construction.

In addition to substantially eliminating vibration in reciprocating tools of the kind referred to herein, and the other advantages hereinbefore mentioned, it will be obvious from the foregoing disclosure that I have also provided a novel means for converting rotary motion to reciprocating motion along an axis substantially parallel to the axis of the rotary shaft, in which no pitman is required and in which a minimum number of friction points are used, thereby reducing lubrication to a minimum.

It is also pointed out that the machine disclosed herein provides for one-hand operation due to its lightness, compactness, and balanced vibration free design. In addition, the said machine may be operated with a much lower expenditure of applied power than any known machines of this type.

In the above description, I have set forth the preferred embodiments of my invention, but it is to be understood that modifications may be made without departing from the spirit of the invention.

I claim:

1. In a reciprocating tool, the combination of a housing including side walls, spaced transverse partitions in said housing, a shaft rotatably mounted in said partitions, a crank mechanism including a crank-pin secured to one end of said shaft, a sliding block pivotally mounted on said crank-pin, two opposite sides of said block having transversely extending convex surfaces of revolution, a pin mounted in the side walls of said housing forwardly of said crank mechanism, the axis of said pin extending in a direction substantially at right angles to the axis of said shaft, an elongate rocker arm including a pair of spaced pivot arms extending forwardly from the central portion thereof, said pivot arms being pivotally mounted on said pin, a slot in the rearward face of said rocker arm extending transversely thereof, opposite sides of said slot having concave surfaces of revolution complementary to the convex surfaces of revolution of said sliding block, said sliding block being positioned in said slot, the depth of said slot being greater than the depth to which said block and crank-pin extend thereinto, an elongate beam member pivotally mounted on said pin between the pivot arms of said rocker arm, resilient means on opposite sides of said pin connecting said beam to said rocker arm for movement therewith, a cylinder having an elongate axially extending opening connected to said housing, the axis of said cylinder being substantially parallel to the axis of said shaft, a piston in said cylinder, said piston having an axial bore and an elongate axially extending opening leading into said bore, said beam extending through said openings and terminating in the bore of said piston, resilient means pivotally connecting said beam to said piston, and means for rotating said shaft, said resilient means increasing the speed and hitting power of the piston near the ends of its stroke.

2. In a reciprocating tool, the combination of a housing including side walls, spaced transverse partitions in said housing, a shaft rotatably mounted in said partitions, a crank mechanism including a crank-pin secured to one end of said shaft, a sliding block pivotally mounted on said crank-pin, two opposite sides of said block having transversely extending convex surfaces of revolution, a pin mounted in the side walls of said housing forwardly of said crank mechanism, the axis of said pin extending in a direction substantially at right angles to the axis of said shaft, an elongate rocker arm including a pair of spaced pivot arms extending forwardly from the central portion thereof, said pivot arms being pivotally mounted on said pin, a slot in the rearward face of said rocker arm extending transversely thereof, opposite sides of said slot having concave surfaces of revolution complementary to the convex surfaces of revolution of said sliding block, said sliding block being positioned in said slot, the depth of said slot being greater than the depth to which said block and crank-pin extend thereinto, an elongate beam member pivotally mounted on said pin between the pivot arms of said rocker arm, resilient means on opposite sides of said pin connecting said beam to said rocker arm for movement therewith, a cylinder having an elongate axially extending opening connected to said housing, the axis of said cylinder being substantially parallel to the axis of said shaft, a piston in said cylinder, said piston having an axial bore and an elongate axially extending opening leading into said bore, said beam extending through said openings and terminating in the bore of said piston, and resilient means pivotally connecting said beam to said piston, said resilient means increasing the speed and hitting power of the piston near the ends of its stroke.

3. In a reciprocating tool, the combination of a housing, a shaft rotatably mounted longitudinally of said housing, a crank mechanism including a crank-pin secured to one end of said shaft, a sliding block pivotally mounted on said crank-pin, two opposite sides of said block having transversely extending convex surfaces of revolution, a pin mounted transversely of said housing forwardly of said crank mechanism, an elongate rocker arm including a pair of spaced pivot arms extending forwardly from the central portion thereof, said pivot arms being pivotally mounted on said pin, a slot in the rearward face of said rocker arm extending transversely thereof, opposite sides of said slot having concave surfaces of revolution complementary to the convex surfaces of revolution of said sliding block, said sliding block being positioned in said slot, the depth of said slot being greater than the depth to which said block and crank-pin extend thereinto, an elongate beam member pivotally mounted on said pin between the pivot arms of said rocker arm, resilient means on opposite sides of said pin connecting said beam to said rocker arm for movement therewith, a cylinder connected to said housing, the axis of said cylinder being substantially parallel to the axis of said shaft, a piston in said cylinder, said piston having an axial bore and an opening leading into said bore, said beam extending through said opening and terminating in the bore of said cylinder, and resilient means pivotally connecting said beam to said piston, said resilient means increasing the speed and hitting power of the piston near the ends of its stroke.

4. In a reciprocating tool, the combination of a housing, a shaft rotatably mounted in said housing, an eccentric mechanism secured to one end of said shaft, said eccentric mechanism including a pivoted sliding block, two opposite sides of said block having transversely extending convex surfaces of revolution, a pin mounted in said housing forwardly of said eccentric mechanism, the axis of said pin extending in a direction substantially at right angles to the axis of said shaft, an elongate rocker arm including a pair of spaced pivot arms extending forwardly from the central portion thereof, said pivot arms being pivotally mounted on said pin, a slot in the rearward face of said rocker arm extending transversely thereof, opposite sides of said slot having concave surfaces of revolution complementary to the convex surfaces of revolution of said sliding block, said sliding block being positioned in said slot, the depth of said slot being greater than the depth to which said eccentric mechanism including said block extends thereinto, an elongate beam member pivotally mounted on said pin between the pivot arms of said rocker arm, resilient means on opposite sides of said pin connecting said beam to said rocker arm for movement therewith, a cylinder connected to said housing, the axis of said cylinder being substantially parallel to the axis of said shaft, a piston in said cylinder, and means pivotally connecting said beam to said piston, said resilient means increasing the speed and hitting power of the piston near the ends of its stroke.

5. In a reciprocating tool, the combination of a housing, a shaft rotatably mounted in said housing, an eccentric mechanism secured to one end of said shaft, said eccentric mechanism including a member having a transversely extending convex surface of revolution, a pin mounted in said housing forwardly of said eccentric mechanism, the axis of said pin extending in a direction substantially at right angles to the axis of said shaft, an elongate rocker arm including a pair of spaced pivot arms extending forwardly from the central portion thereof, said pivot arms being pivotally mounted on said pin, a slot in the rearward face of said rocker arm extending transversely thereof, opposite sides of said slot having concave surfaces of revolution complementary to the convex surface of revolution of said member of said eccentric mechanism, said member of said eccentric mechanism being positioned in said slot, the depth of said slot being greater than the depth to which said eccentric mechanism including said member extends thereinto, an elongate beam member pivotally mounted on said pin between the pivot arms of said rocker arm, resilient means on opposite sides of said pin connecting said beam to said rocker arm for movement therewith, a cylinder connected to said housing, the axis of said cylinder being substantially parallel to the axis of said shaft, a piston in said cylinder, and means pivotally connecting said beam to said piston, said resilient means increasing the speed and hitting power of the piston near the ends of its stroke.

6. In a reciprocating tool, the combination of a housing, a shaft rotatably mounted in said housing, a crank mechanism including a crank-pin secured to one end of said shaft, a sliding block pivotally mounted on said crank-pin, two opposite sides of said block having transversely extending convex surfaces of revolution, a pin mounted in said housing forwardly of said crank mechanism, the axis of said pin extending in a direction substantially at right angles to the axis of said shaft, an elongate rocker arm including a pair of spaced pivot arms extending forwardly from the central portion thereof, said pivot arms being pivotally mounted on said pin, a slot in the rearward face of said rocker arm extending transversely thereof, opposite sides of said slot having concave surfaces of revolution complementary to the convex surfaces of revolution of said sliding block, said sliding block being positioned in said slot, the depth of said slot being greater than the depth to which said block and crank-pin extend thereinto, an elongate beam member pivotally mounted on said pin between the pivot arms of said rocker arm, and resilient means on opposite sides of said pin connecting said beam to said rocker arm for movement therewith.

7. In a means for converting rotary motion to reciprocating motion, the combination of a support, a shaft rotatably mounted in said support, an eccentric mechanism including a member having at least one transversely extending convex surface of revolution secured to said shaft, a rocker arm, means including a pin pivotally mounting said rocker arm about an axis extending at right angles to the axis of said shaft, said rocker arm comprising a transverse slot having at least one side provided with a concave surface of revolution complementary to the convex surface of revolution of said member, said member being received in said slot, an elongate beam pivotally mounted on said pin, resilient means on opposite sides of said pin connecting said beam to said rocker arm for movement therewith, a cylinder, means supporting said cylinder with its axis substantially parallel to the axis of said shaft, a piston in said cylinder, and resilient means pivotally connecting said piston to said beam, said resilient means increasing the speed and hitting power of the piston near the ends of its stroke.

8. In a means for converting rotary motion to reciprocating motion, the combination of a support, a shaft rotatably mounted in said support, an eccentric mechanism including a member having at least one transversely extending convex surface of revolution secured to said shaft, a rocker arm, means including a pin pivotally mounting said rocker arm about an axis extending at right angles to the axis of said shaft, said rocker arm comprising a transverse slot having at least one side provided with a concave surface of revolution complementary to the convex surface of revolution of said member, said member being received in said slot, an elongate beam pivotally mounted on said pin, resilient means on opposite sides of said pin connecting said beam to said rocker arm for movement therewith, a cylinder, means supporting said cylinder with its axis substantially parallel to the axis of said shaft, a piston in said cylinder, and means pivotally connecting said piston to said beam, said resilient means increasing the speed and hitting power of the piston near the ends of its stroke.

9. In a means for converting rotary motion to reciprocating motion, the combination of a support, a shaft rotatably mounted in said support, an eccentric mechanism including a member having at least one transversely extending convex surface of revolution secured to said shaft, a rocker arm, means including a pin pivotally mounting said rocker arm about an axis extending at right angles to the axis of said shaft, said rocker arm comprising a transverse slot having at least one side provided with a concave surface of revolution complementary to the convex surface of revolution of said member, said member being received in said slot, an elongate beam pivotally mounted on said pin, and resilient means on opposite sides of said pin connecting said beam to said rocker arm for movement therewith.

10. In a means for converting rotary motion to reciprocating motion, the combination of a support, a shaft rotatably mounted on said support, a crank mechanism including a crank-pin secured to one end of said shaft, a sliding block pivotally mounted on said crank pin, two opposite sides of said block having convex surfaces of revolution, a rocker arm, means pivotally mounting said rocker arm on said support, said arm comprising a transverse slot having opposite sides provided with concave surfaces of revolution complementary to the convex surfaces of revolution of said sliding block, said sliding block being received in said slot, an elongate beam, means pivotally mounting said beam on said support, resilient means on opposite sides of said pivotal mounting means connecting said beam to said rocker arm for movement therewith, a cylinder, means supporting said cylinder with its axis substantially parallel to the axis of said shaft, a piston in said cylinder, and means pivotally connecting said piston to said beam, said resilient means increasing the speed and hitting power of the piston near the ends of its stroke.

11. In a means for converting rotary motion to reciprocating motion, the combination of a support, a shaft rotatably mounted on said support, a crank mechanism including a crank-pin secured to one end of said shaft, a sliding block pivotally mounted on said crank-pin, two opposite sides of said block having convex surfaces of revolution, a rocker arm, means pivotally mounting said rocker arm on said support, said rocker arm comprising a transverse slot having opposite sides provided with concave surfaces of revolution complementary to the convex surfaces of revolution of said sliding block, said sliding block being received in said slot, an elongate beam, means pivotally mounting said beam on said support, and resilient means on opposite sides of said pivotal mounting means connecting said beam to said rocker arm for movement therewith.

12. In a means for converting rotary motion to reciprocating motion, the combination of a support, a shaft rotatably mounted on said support, an eccentric mechanism including a member having at least one transversely extending convex surface of revolution secured to said shaft, a rocker arm, means pivotally mounting said rocker arm on said support, said rocker arm comprising a transverse slot having at least one side provided with a concave surface of revolution complementary to the convex surface of revolution of said member, said member being received in said slot, an elongate beam, means pivotally mounting said beam on said support, resilient means on opposite sides of said pivotal mounting means connecting said beam to said rocker arm for movement therewith, a cylinder, means supporting said cylinder with its axis substantially parallel to the axis of said shaft, a piston in said cylinder, and means pivotally connecting said piston to said beam, said resilient means increasing the speed and hitting power of the piston near the ends of its stroke.

13. In a means for converting rotary motion to reciprocating motion, the combination of a support, a shaft rotatably mounted on said support, an eccentric mechanism including a member having at least one transversely extending convex surface of revolution secured to said shaft, a rocker arm, means pivotally mounting said rocker arm on said support, said rocker arm comprising a transverse slot having at least one side provided with a concave surface of revolution complementary to the convex surface of revolution of said member, said member being received in said slot, an elongate beam, means pivotally mounting said beam on said support, and resilient means on opposite sides of said pivotal mounting means connecting said beam to said rocker arm for movement therewith.

RUPERT F. JACKSON.

REFERENCES CITED

The following references are of record in the file of this patent:

UNITED STATES PATENTS

| Number | Name | Date |
|---|---|---|
| 726,795 | Cornu | Apr. 28, 1913 |
| 1,112,747 | Wingo | Oct. 6, 1914 |
| 1,798,082 | Grutzbach | Mar. 24, 1931 |
| 1,864,549 | Paul | June 28, 1932 |
| 2,184,781 | Ryan | Dec. 26, 1939 |
| 2,307,431 | Tilden et al. | Jan. 5, 1943 |

FOREIGN PATENTS

| Number | Country | Date |
|---|---|---|
| 411,879 | France | June 28, 1910 |